United States Patent [19]
Kennedy

[11] 4,285,245
[45] Aug. 25, 1981

[54] METHOD AND APPARATUS FOR MEASURING AND CONTROLLING VOLUMETRIC FLOW RATE OF GASES IN A LINE

[75] Inventor: Lyn R. Kennedy, Dallas, Tex.

[73] Assignee: Precision Machine Products, Inc., Dallas, Tex.

[21] Appl. No.: 100,918

[22] Filed: Dec. 6, 1979

[51] Int. Cl.$^3$ .............................................. G01F 1/34
[52] U.S. Cl. ........................................ 73/861; 73/199
[58] Field of Search .................... 73/861, 199, 861.42, 73/861.52, 861.53

[56] References Cited

U.S. PATENT DOCUMENTS

| | | | |
|---|---|---|---|
| 3,363,461 | 1/1968 | Minkoff | 73/861 |
| 4,127,030 | 11/1978 | Martig, Jr. | 73/861 |

*Primary Examiner*—Herbert Goldstein
*Attorney, Agent, or Firm*—Joseph H. Schley; Thomas L. Cantrell; Stanley R. Moore

[57] ABSTRACT

Disclosed is a method and apparatus for measuring and controlling volumetric flow rate of gases. The apparatus includes a measurement chamber of fixed volume in a flow line, a controllable inlet valve upstream from the chamber, and flow regulator means for establishing constant flow output downstream from the chamber. Also provided are measuring and control equipment including a pressure sensor in the chamber, means for controlling operation of the inlet valve, timing means, and means for calculating volumetric flow rate. The method involves closing the inlet valve at a chosen time for a selected interval, to interrupt flow into the measurement chamber, while maintaining constancy of flow out of the chamber. During at least part of the interval in which the inlet valve is closed, the pressure decrease is measured, and the rate of pressure decrease is calculated by dividing the measured pressure drop by the time measured by the timing means. The thus calculated rate of fall of pressure is directly related to the volumetric flow rate, which is thus determined.

24 Claims, 3 Drawing Figures

METHOD AND APPARATUS FOR MEASURING AND CONTROLLING VOLUMETRIC FLOW RATE OF GASES IN A LINE

BACKGROUND OF THE INVENTION a. The Need For Delivery Of Gas At A Constant Known Flow Rate

There are many situations in which it is required that gas be delivered through a line at a constant and known flow rate. Various types of chromatography apparatus have this requirement.

Other examples may be seen in the methods and apparatuses disclosed in Clingman U.S. Pat. Nos. 3,777,562; 4,062,236; 4,125,018; and 4,125,123. Generally speaking, these methods and equipment measure the calorific value of a gaseous fuel by causing the fuel to be delivered to a combustion system at a flow rate which maximizes the adiabatic flame temperature. The volumetric flow rate at ambient conditions must be accurately determined in these methods and equipment because it is a component in the determination of calorific value. The measurement of volumetric flow rate must be made independently of temperature, pressure, and gas compositions. The last of these requirements, independence from gas composition, is particularly important in such methods and equipment, because they are employed in situations where the gas composition can vary continually and is not known in advance of the making of the measurement. Thus the flowmeter, of whatever kind employed, cannot be calibrated for a particular gas composition, as is possible for some other gas flow measurement situations. The flow measurement must also be reproducible within one part per thousand.

b. Deficiencies of Prior Art Methods and Equipment

The conditions and requirements outlined above are not well met by the commonly used methods of flow measurement or control. Orifice meters and other methods which depend on measurement of the pressure drop across a flow restriction are sensitive to gas density, which is a function of temperature, pressure, and gas composition. Hot wire flow meters are sensitive to gas properties. Axial flow turbine flow meters are relatively free from sensitivity to gas composition, but contain moving parts which are subject to wear, causing maintenance problems and making recalibration work necessary at intervals as the wear occurs.

c. Certain Prior Art

U.S. Pat. No. 3,125,881 to Peters et al. shows a flow measurement system for liquid in which the time required for a predetermined volume of liquid to flow into a tank is measured to determine flow rate. Following each such measurement, the liquid is drawn from the tank more rapidly than it enters it, to empty the tank in readiness for the next measurement.

U.S. Pat. No. 3,500,826 to Haire controls the feed of gas from a high pressure supply to a low pressure receiver from which it is withdrawn at uneven rates (as in an oxygen mask receiver) by sensing the pressure in the receiver and utilizing the sensed value to control the setting of a valve between the supply and the receiver.

U.S. Pat. No. 3,878,376 to Sholes et al. utilizes a computer to direct the actuation of valves in high pressure, atmospheric pressure and vacuum lines connected to a closed pressured volume of gas to adjust the pressure therein in response to signals from a pressure transducer sensing the pressure in the volume.

U.S. Pat. No. 3,665,959, to Castillon shows a flow meter using a sonic nozzle so that advantage may be taken of the circumstance that flow rate through such a nozzle is solely a function of absolute temperature and pressure upstream of the nozzle, both of which parameters being measured to obtain the flow rate.

U.S. Pat. No. 3,633,416 to Van Dyke et al. and U.S. Pat. No. 4,096,746 to Wilson et al. shows systems utilizing diaphragm actuated devices to control pressure, flow, or both.

U.S. Pat. No. 3,970,472 to Jones et al. shows a flow measurement system using a rotometer type flowmeter in conjunction with an upstream regulator.

The following U.S. patents all show systems employing orifice type meters for measuring differential pressure across the meter: U.S. Pat. Nos. 2,132,338 to Ziebolz; 2,317,807 to Ryder; 2,352,312 to Donaldson; 2,862,162 to Baring; 2,878,825 to Grogan et al.; and 3,543,784 to Smith.

SUMMARY OF THE INVENTION

In accordance with the present invention, methods and apparatus are provided for measuring and controlling the volumetric flow rate of gas flowing in a line, which are not sensitive to pressure, temperature, or gas composition. In the methods and apparatus the gas flowing in a line is flowed through equipment which imposes a constancy or uniformity of flow downstream through the line even though the pressure in the line on the upstream side of that equipment varies. At a point in the line some distance upstream from the flow uniformity devices a valve means is provided for periodically restricting flow in the line at the point. Preferably the periodic restriction is complete, i.e., the valve means is completely closed to cause an interruption in flow through the valve means. If the restriction is less than complete, the rate of pressure fall used as a flow measurement parameter, as discussed below, is more difficult to detect.

Upon operation of the upstream valve means to restrict or interrupt flow, the pressure in the line between the valve means and the flow uniformity devices starts to fall, because downstream flow is maintained constant, while flow at the upstream valve means is restricted or interrupted. The volume in the line remains constant, the quantity of gas is depleted at a constant or uniform rate, and the pressure falls as a consequence. The rate of fall of pressure is proportional to the rate of flow, and in accordance with the invention is measured by sensing the pressure at the beginning and the end of a time increment, and dividing the pressure drop by the time increment. Time increments of equal length may be used from measurement to measurement, or pressure drops of equal size may be used from one measurement to the next. In the latter case, the length of a time increment is inversely proportional to the rate of flow.

It is preferred that a fixed volume measurement chamber be inserted into the line between the upstream valve means and the downstream flow uniformity devices, so that longer time increments for measuring pressure drop may be employed and longer cycles of flow measuring may be utilized.

From the foregoing, it can be seen that the equipment aspects of the invention are quite simple. There is provided a line (with a measurement chamber, if desired) one or more flow uniformity devices downstream in the line, an upstream valve means for repeatedly interrupting or restricting flow, means for detecting and timing the pressure drop, and for dividing the pressure drop by the time increment to produce a rate signal proportional to flow rate. The rate signal may be displayed and/or recorded. It may also be used, alone or in conjunction with other equipment, to actuate and control equipment, such as one or more of the downstream flow uniformity devices for altering the flow rate. Preferably, the pressure sensor is a transducer producing an electrical output, and electrical techniques, including either analogue or digital techniques are used to time the measuring intervals, perform the rate of pressure fall calculation, cycle the valve means, and generate control and display signals.

The methods and apparatus of the invention are not sensitive to temperature and pressure level or to gas properties such as density or composition. The apparatus involves no critical moving parts, such as are involved in a turbine meter. Wear in the only moving part of importance, the upstream interrupter valve, is of no consequence until it reaches a point where a leak develops.

If operating conditions or the nature of the gas are such that the supercompressibility of the flowing gas should be taken into account in determining the rate of pressure fall, and in turn, the flow rate, a modification of the basic method of the invention may be employed. No hardware modifications are involved, although the programming of the control equipment may be changed. In accordance with the modification, during a single flow interruption or restriction rate of pressure fall is determined at two separate time increments. The two rates are compared. If they are the same, the effect of supercompressibility is inconsequential. If they differ, then a supercompressibility correction factor proportional to the size of the difference is applied to the flow rate signal.

From the foregoing it can be seen that the objects of the invention include the provision of methods and apparatus for measuring and controlling the volumetric flow rate of a gas flowing in a line which are simple, reliable, and insensitive to ambient pressure and temperature, as well as gas properties, and insensitive to wear of parts.

The manner in which the foregoing objects and purposes, as well as others, are accomplished may best be understood from a consideration of the detailed description which follows, together with the accompanying drawings.

DESCRIPTION OF THE PREFERRED EMBODIMENTS

Figure 1:
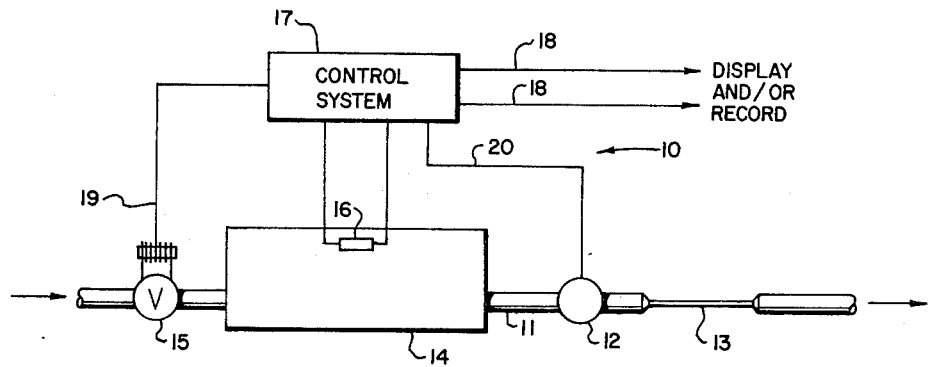
FIG. 1 is a diagrammatic illustration of an apparatus for measuring and controlling volumetric flow rate constructed in accordance with the invention.

In FIG. 1, the measuring apparatus of the invention is designated generally as 10. It is shown in association with a gas flow line 11, through which gas is delivered from left to right as FIG. 1 is drawn. The equipment includes flow uniformity devices, which in the preferred embodiment comprise a pressure regulator 12 and capillary 13, both of which are located in line 11, with the pressure regulator upstream of the capillary.

Upstream in line 11 from the pressure regulator 12 is flow measurement chamber 14. The chamber is preferably of fixed volume, and represents a local enlargement of the volume of the line 11. Line 11 itself between pressure regulator 11 and upstream valve means 15 (discussed below) may be considered a limiting case of the flow measurement chamber.

Also positioned in line 11, at a point upstream from the measurement chamber, is upstream valve means 15, sometimes referred herein to as an interrupter valve, although as explained above it may be arranged to restrict rather than fully interrupt flow in line 11. In the preferred embodiment valve means 15 is a solenoid controlled valve, although other types of valve, such as a rotary valve which opens and closes as it rotates, may be used.

A pressure sensor 16 is mounted in chamber 14. In the preferred embodiment sensor 16 is a strain gauge type sensor with an electrical output, i.e., it is a pressure transducer, but other types of pressure sensors or transducers may be employed if desired.

Transducer 16 is connected to control system 17. In the preferred embodiment, this is an electrical system utilizing conventional switching techniques to operate the equipment in accordance with the methods of the invention. If desired, the control system may employ conventional solid state microprocessor techniques. If so, it may include items such as an electronic timing device or clock, an analog-to-digital converter, output signal amplifiers, storage memory for the control program, an arithmetic unit for dividing a time signal into the signal resulting from the subtraction of two pressure signals, and the like.

Output signals from control system 17 are fed through lines 18 to display and/or recording means of any desired type. Line 19 connects the control system to solenoid valve 15 for carrying signals which effectuate its opening and closing.

The equipment as described thus far comprises the basic flow measurement apparatus of the invention. It it is desired to employ the apparatus to control the flow rate, in the sense of altering it in response to information gained in the measurement apparatus, control system 17 may be connected by line 20 to flow rate altering means which may, for example, comprise the adjustable parts of pressure regulator 12. As another example, the flow altering means may comprise a motorized valve interposed in line 11 regulator 12 and capillary 13.

The purpose of the flow uniformity devices 12 and 13 is to create a set of pressure conditions downstream of measurement chamber 14 such that a uniformity or constancy of flow out of chamber 14 is imposed throughout a measurement cycle, even though the pressure in the chamber varies during the cycle. The set of devices employed in the preferred embodiment accomplishes this well. Capillary 13 imposes a flow restriction of such magnitude that flow through it will be essentially constant if the pressure at its inlet is constant. Pressure regulator 12 imposes this constancy. It should be noted that the constancy or uniformity sought by the use of the flow uniformity devices is not uniformity in absolute value, since it is contemplated that the absolute flow rate will vary with time, but rather uniformity during a measurement cycle, at whatever flow rate existed just prior commencement of that cycle.

While the preferred embodiment employs capillary 13 as a flow restriction, other flow restricting devices may be employed. Furthermore, the flow restriction may be part (or all) of a piece of downstream equipment, such as a gas analyser or instrument for determining the calorific value of fuel gas, and in that downstream equipment may be in the form of a capillary, or in another form.

The purpose of the pressure regulator 12, as mentioned above, is to provide a constant pressure upstream of the restriction. This assures a constant molar flow out of chamber 14, even though the pressure in that chamber is varying during the course of a cycle, first falling and then rising. In the preferred embodiment the pressure regulator is a Model 8286 manufactured by Porter Instrument Co., but other conventional pressure regulators may be used.

Figure 2:
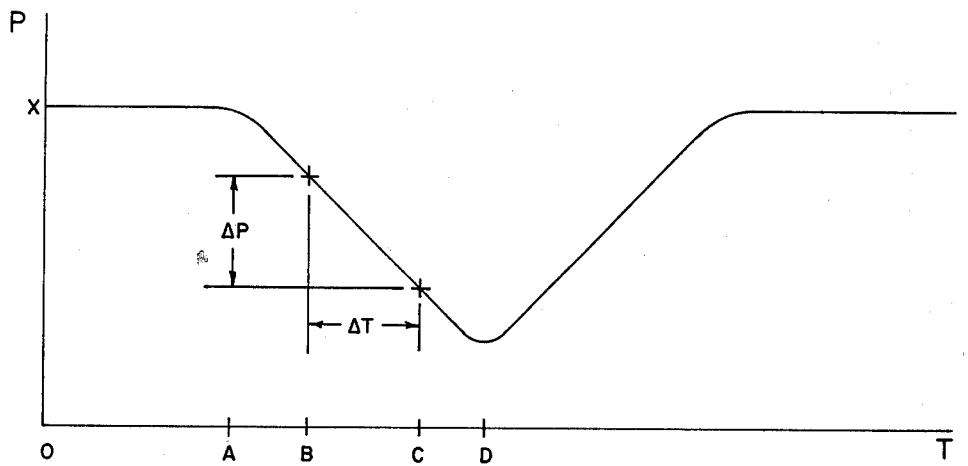
FIG. 2 is a plot of pressure against time in the measurement apparatus of FIG. 1 when operated in accordance with the basic method of the invention.
Figure 3:
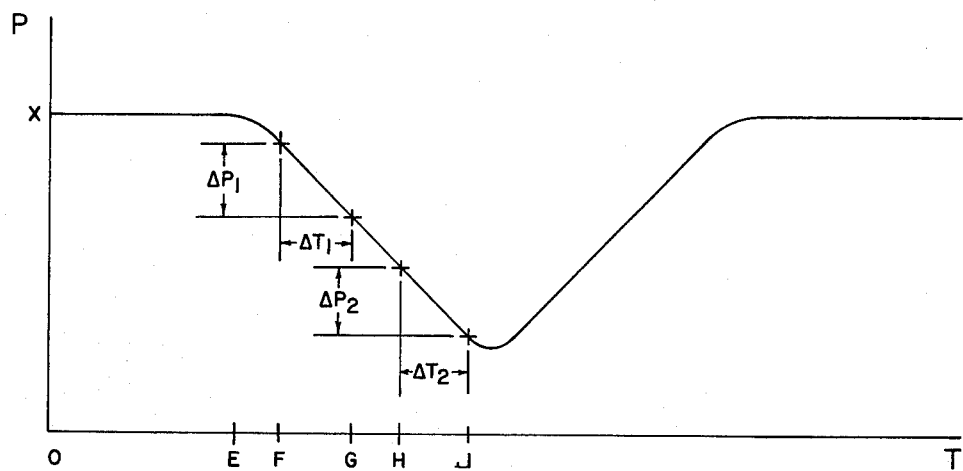
FIG. 3 is a plot of pressure against time in the measurement apparatus of FIG. 1 when operated in accordance with a modified method of the invention.

The operation of the apparatus of FIG. 1, and the method aspects of the invention may be understood by considering FIG. 1 together with FIGS. 2 and 3. The initial condition is that valve 15 is open and gas is flowing through line 11 from left to right in FIG. 1, under the influence of pressure existing or applied in line 11 upstream from apparatus 10. This initial condition is represented in FIG. 2 by the horizontal line extending from time "O" to time "A" at a pressure value of "X."

At time "A" the control system actuates valve 15 to close it. The supply of gas in chamber 14 starts to fall, as gas continues to flow uniformly out of it through pressure regulator 12 and capillary 13. As the quantity of gas decreases its pressure decreases below the value "X," this phenomenon being shown on FIG. 2 by the downwardly sloping portion of the line representing pressure.

At time "B," the control system 17 causes a pressure reading to be taken by pressure transducer 16, and a time reading to be taken on the clock internal in system 17, to obtain respectively $P_1$ and $T_1$. At time C, another set of pressure and time readings $P_2$ and $T_2$ are taken. Control system 17 then subtracts and divides the readings to obtain the rate of pressure fall, whose value is $P_1-P_2/T_2-T_1$. This value, in accordance with the invention, is substantially proportional to the steady state flow rate, i.e., the volumetric flow rate between time "O" and time "A" at ambient conditions.

At time "D" control system 17 actuates valve 15 to reopen it, and the pressure in chamber 14 climbs back to the value "X."

If the apparatus of FIG. 1 is being used to control flow rate as well as measure it, and if the flow rate measured in the manner just described is not the desired flow rate, control system 17 sends a signal through line 20 to pressure regulator 12 to change its setting in a direction tending to establish the desired flow rate.

It is important to have good heat transfer from the environment to the gas in the measurement chamber. For the value of $(\Delta P/\Delta T)$ to be strictly proportional to the flow rate, the temperature of the gas must be constant. Without good heat transfer expansion and compression of gas in the chamber can change its temperature in a cyclic manner. This heat transfer is achieved primarily by having a high surface to volume ratio in the measurement chamber. Chamber 14 may be provided with surface fins to improve heat transfer, if desired.

In an altered form of the method of the invention, two independent measurements are made using the apparatus shown in FIG. 1, which is illustrated in FIG. 3. During a first time increment, $\Delta T_1$, (between times "F" and "G") a pressure change, $\Delta P_1$, is measured. During a second and subsequent time increment, $\Delta T_2$, (between times "H" and "J") the pressure change, $\Delta P_2$, is measured. The two rates of pressure change $(\Delta P_1/\Delta T_1)$ and $(\Delta P_2/\Delta T_2)$, are observed and compared. If they are the same, then the flow rate is proportional to $(\Delta P_1/\Delta T_1)$. If the two rates are different, then the flow rate measurement is corrected for the supercompressibility of the gas. The size of the correction is proportional to the difference in the rates.

The invention has several advantages which are worth emphasizing. The flow measurement does not depend on the properties of the gas such as density or viscosity. This is a significant advantage over other flow measurement methods. If gas density and/or viscosity changes in an unknown manner, the invention can still measure the flow accurately. Other flow measurement devices have to be recalibrated.

A second major advantage of the invention is that there are no critical wearing parts. Turbine flowmeters are available which have minimal sensitivity to viscosity and density. In such flowmeters, however, continuous wear can cause frequent recalibrations to be necessary. In the invention, the only component with continuously moving mechanical parts is the inlet valve 15 to the measurement chamber. If the valve actuating mechanism or seal should wear, this will have no effect on the measurement until a leak occurs when the inlet valve was closed.

I claim:

1. A method for determining the volumetric flow rate of gas flowing in a line comprising:
   imposing uniformity of flow rate on said gas at a downstream point in said line;
   temporarily restricting gas flow in said line at a point upstream from said downstream point;
   and measuring the rate of pressure fall in said line between said upstream and downstream points during at least part of the time of restricted gas flow at said upstream point, said rate of pressure fall being substantially proportional to the volumetric flow rate of the gas.

2. A method in accordance with claim 1 and further comprising:
   making said measurement of the rate of pressure fall twice during said time of restricted gas flow;
   comparing the two measurements; and
   connecting said volumetric flow rate determination for gas supercompressibility if said measurements differ upon comparison.

3. A method in accordance with claims 1 or 2 and further comprising effecting transfer of heat between the environment and the gas in said line between said upstream and downstream points at least during the time of restricted flow in a direction tending to maintain the temperature of the gas in said line constant.

4. A method in accordance with claims 1 or 2 in which said temporary restriction of gas flow is a complete restriction or interruption of flow.

5. A method in accordance with claim 1 in which the measurement of said rate of pressure fall is determined by measuring the time required for the pressure to fall from one selected value to another lower selected value.

6. A method in accordance with claim 1 in which the measurement of said rate of pressure fall is determined by measuring the pressure at the beginning and end of a selected time interval, subtracting the lesser pressure from the larger pressure, and dividing the difference by said selected time interval.

7. A method in accordance with claim 1 in which said uniformity of flow rate at a downstream point in said line is imposed by bringing said gas to a uniform pressure at said downstream point and delivering it into and through a flow restriction farther downstream of said downstream point.

8. A method in accordance with claim 1 in which said temporary restriction of gas flow at an upstream point in said line is effected by closing a valve means in said line at said upstream point for a selected time.

9. A method in accordance with claim 1 and further comprising comparing the measured volumetric flow rate of the gas with a desired flow rate and altering said imposed uniformity of flow rate to bring it into coincidence with the desired flow rate.

10. A method in accordance with claim 1 and further comprising flowing said gas into and out of a chamber of fixed volume interposed in said line between said upstream and downstream points.

11. A method for delivering gas through a line to a point of use at a selected and measured volumetric flow rate comprising:
    flowing gas through a line toward said point of use;
    imposing uniformity of rate of flow on said flowing gas a selected downstream point in said line by flowing the gas through a restriction in the line and establishing and maintaining a uniform pressure in the gas introduced into said restriction;
    temporarily interrupting flow of gas in said line at a selected point in said line upstream of said selected downstream point, said temporary interruption occupying a selected time interval and being repeated at selected times; and
    measuring the rate of fall of pressure in the portion of said line lying between said upstream and downstream points during at least a portion of the duration of said temporary interruption to obtain a measurement of the volumetric rate of flow at ambient conditions unaffected by variability in gas composition, viscosity, or density.

12. A method in accordance with claim 11 and further comprising flowing said gas into and out of a chamber of fixed volume between said upstream and downstream points.

13. Apparatus for determining the volumetric flow rate of gas flowing in a line comprising:
    means for imposing uniformity of flow rate on said gas at a downstream point in said line;
    upstream valve means for temporarily restricting gas flow in said line at a point upstream from said downstream point; and
    means for measuring the rate of pressure fall in said line between said upstream and downstream points during at least part of the time said gas flow is restricted by said upstream valve means, said rate of pressure fall being substantially proportional to the volumetric flow rate of the gas.

14. Apparatus in accordance with claim 13 and further comprising a measurement chamber of fixed volume interposed in said line between said upstream and downstream points.

15. Apparatus in accordance with claim 13 or 14 in which said line and/or chamber are constructed and arranged to effect good heat transfer between said gas and the ambient.

16. Apparatus in accordance with claim 13 in which said measuring means comprise timing means and pressure sensing means.

17. Apparatus in accordance with claim 16 in which said pressure sensing means is arranged to actuate said timing means at a first selected pressure and to deactuate said timing means at a second selected lower pressure to produce a timing signal inversely proportional to volumetric flow rate.

18. Apparatus in accordance with claim 16 in which said timing means is arranged to actuate said pressure sensing means at two points in time following restriction of said gas flow by said upstream valve means.

19. Apparatus in accordance with claim 13 in which said upstream valve means is arranged to temporarily interrupt said gas flow.

20. Apparatus in accordance with claim 13 in which said means for imposing uniformity of flow rate comprise:
    a flow restriction in said line; and
    a pressure regulator upstream of said flow restriction for maintaining the pressure of gas entering said restriction uniform.

21. Apparatus in accordance with claim 20 in which said flow restriction comprises a capillary.

22. Apparatus in accordance with claim 20 in which said flow restriction comprises part of a piece of downstream equipment.

23. Apparatus in accordance with claim 20 and further comprising means for altering the pressure setting of said pressure regulator to alter the flow rate in said line.

24. Apparatus in accordance with claim 13 and further comprising means responsive to said measuring means for altering the characteristics of said means for imposing uniformity of flow to change the flow rate at which said uniformity is imposed.

* * * * *